US010055907B2

(12) United States Patent
Rood

(10) Patent No.: US 10,055,907 B2
(45) Date of Patent: *Aug. 21, 2018

(54) DIAGNOSTIC SYSTEM FOR A VEHICLE

(71) Applicant: Shem, LLC, Hagerstown, IN (US)

(72) Inventor: Christopher Rood, Greenfield, IN (US)

(73) Assignee: Shem, LLC, Hagerstown, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,482

(22) Filed: Dec. 5, 2016

(65) Prior Publication Data

US 2017/0213399 A1    Jul. 27, 2017

Related U.S. Application Data

(63) Continuation of application No. 14/588,701, filed on Jan. 2, 2015, now Pat. No. 9,514,581.

(60) Provisional application No. 61/930,261, filed on Jan. 22, 2014, provisional application No. 61/923,454, filed on Jan. 3, 2014.

(51) Int. Cl.
| | |
|---|---|
| *G07C 5/08* | (2006.01) |
| *B60W 50/02* | (2012.01) |
| *B60W 50/04* | (2006.01) |
| *F02D 41/22* | (2006.01) |
| *G07C 5/00* | (2006.01) |

(52) U.S. Cl.
CPC ....... *G07C 5/0808* (2013.01); *B60W 50/0205* (2013.01); *B60W 50/04* (2013.01); *F02D 41/22* (2013.01); *G07C 5/0816* (2013.01); *F02N 2200/08* (2013.01); *G07C 5/008* (2013.01); *G07C 2205/02* (2013.01)

(58) Field of Classification Search
None
See application file for complete search history.

(56) References Cited

U.S. PATENT DOCUMENTS

| | | | |
|---|---|---|---|
| 4,843,557 A | 6/1989 | Ina et al. | |
| 5,568,387 A | 10/1996 | Andersson | |
| 5,594,646 A | 1/1997 | Itoh et al. | |
| 5,957,985 A | 9/1999 | Wong et al. | |
| 6,292,741 B1 | 9/2001 | Bitzer et al. | |
| 6,434,459 B2 | 8/2002 | Wong et al. | |
| 6,526,340 B1 * | 2/2003 | Reul .................... | G05B 23/027 340/439 |

(Continued)

*Primary Examiner* — Dirk Wright
(74) *Attorney, Agent, or Firm* — Banner & Witcoff, Ltd.

(57) ABSTRACT

A vehicle that includes a chassis, wheels, a drivetrain including an engine and a transmission, and a brake system. The vehicle also has a vehicle control system that includes controllers for the engine, the transmission controller, and the brake system, a vehicle network connected to the controllers to permit communication to and from these components, and a primary vehicle controller connected to the network and configured to communicate with the controllers. The vehicle further includes a vehicle diagnostic system that is connected to the network and configured to communicate with the various controllers. The diagnostic system is configured to operate in a diagnostic mode, in which the diagnostic system is configured to display diagnostic information from one or more of the controllers. The diagnostic system may further be configured to operate in a display mode, where the vehicle diagnostic system is configured to display operating information regarding the vehicle.

32 Claims, 8 Drawing Sheets

(56) References Cited

U.S. PATENT DOCUMENTS

| | | |
|---|---|---|
| 6,553,290 B1 | 4/2003 | Pillar |
| 6,654,648 B2 | 11/2003 | Nada et al. |
| 6,754,485 B1 | 6/2004 | Obradovich et al. |
| 6,810,314 B2 * | 10/2004 | Tashiro ............... B60G 17/0195 |
| | | 700/20 |
| 6,898,500 B2 | 5/2005 | Kobayashi |
| 7,047,117 B2 | 5/2006 | Akiyama et al. |
| 7,412,307 B2 | 8/2008 | Pillar et al. |
| 7,630,800 B2 | 12/2009 | Hirano et al. |
| 7,711,460 B2 | 5/2010 | Yakes et al. |
| 8,126,606 B2 | 2/2012 | Hung |
| 8,600,605 B2 | 12/2013 | Grenn et al. |
| 8,606,475 B2 | 12/2013 | Yasui |
| 8,645,022 B2 | 2/2014 | Yoshimura et al. |
| 8,775,007 B2 | 7/2014 | Shimizu et al. |
| 8,880,654 B2 * | 11/2014 | Zachos .................. H04L 69/08 |
| | | 709/219 |
| 8,942,889 B2 | 1/2015 | Crombez |
| 9,031,710 B2 | 5/2015 | Barrett |
| 9,047,722 B2 | 6/2015 | Kumik et al. |
| 2004/0054445 A1 * | 3/2004 | Vollmer ............. G05B 19/0421 |
| | | 701/1 |

* cited by examiner

DIAGNOSTIC SYSTEM FOR A VEHICLE

CROSS-REFERENCE TO RELATED APPLICATIONS

This application is a continuation of U.S. patent application Ser. No. 14/588,701, filed Jan. 2, 2015, which is a non-provisional filing of U.S. Provisional Application No. 61/923,454, filed Jan. 3, 2014, and U.S. Provisional Application No. 61/930,261, filed Jan. 22, 2014, all of which prior applications are incorporated by reference herein in their entireties and made part hereof.

TECHNICAL FIELD

The present invention generally relates to a diagnostic system for a vehicle and, in some more specific embodiments, to an onboard vehicle diagnostic system that collects and displays information from an internal communication network on a truck or other vehicle.

BACKGROUND

Trucks, such as refuse hauling trucks, and other vehicles may contain an internal communication network (e.g., a vehicle data bus), which is connected to a number of different components and systems within the vehicle and allows such components and systems to broadcast messages relating to their operations. For example, such components and systems may broadcast messages related to their function or performance, or may broadcast fault codes indicating problems or malfunctions. Information broadcast over the network may be read by various other networked components and/or used to communicate information to a user, such as by use of display gauges (speedometers, tachometers, etc.) or warning lights, or by use of a computer system connected to the network. The network may use a standardized communication standard, such as the J1939 standard, which may be used by heavy duty trucks. However, existing vehicle communication networks and computer systems connected to such networks do not currently provide an integrated system that collects and/or displays selected information broadcast over the network in real time, in a form that is useful for the vehicle operator.

Thus, while certain refuse hauling trucks and other vehicles and diagnostic systems for such vehicles according to existing designs provide a number of advantageous features, they nevertheless have certain limitations. The present invention seeks to overcome certain of these limitations and other drawbacks of the prior art, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the disclosure relate to a vehicle that includes a chassis, a plurality of wheels connected to the chassis, a drivetrain including an engine and a transmission connected to the chassis and configured to supply power to one or more of the wheels, and a brake system connected to the chassis, among other components, such as potentially an operator cab, a body, a fuel system, etc. The vehicle also has a vehicle control system that includes an engine controller connected to the engine and configured to control the engine, a transmission controller connected to the transmission and configured to control the transmission, a brake controller connected to the brake system and configured to control the brake system, a vehicle network connected to the engine controller, the transmission controller, and the brake controller, the vehicle network configured to permit communication to and from these components, and a primary vehicle controller connected to the vehicle network and configured to communicate with the engine controller, the transmission controller, and the brake controller. The vehicle further includes a vehicle diagnostic system that includes a memory, a processor, and a display, and the vehicle diagnostic system is connected to the vehicle network and configured to communicate with the engine controller, the transmission controller, the brake controller, and the primary vehicle controller. The vehicle diagnostic system is configured to operate in a diagnostic mode, in which the vehicle diagnostic system is configured to display diagnostic information from at least the engine controller, the transmission controller, and the brake controller. The vehicle diagnostic system may further be configured to operate in a display mode, where the vehicle diagnostic system is configured to display operating information regarding the vehicle. The vehicle diagnostic system may be configured to monitor all messages on the vehicle network and to display diagnostic information related only to specific messages pertinent to desired functionality, such as by a filtering process. Such filtering may be performed using pre-defined headers on each message.

According to one aspect, the brake system includes a main brake and a parking brake, and the vehicle diagnostic system is configured such that the diagnostic mode is only accessible when the vehicle diagnostic system detects that the vehicle is stationary and the parking brake is engaged. In one embodiment, the vehicle diagnostic system is configured to continuously monitor whether the vehicle is stationary and the parking brake is engaged.

According to another aspect, the vehicle diagnostic system is configured for transmitting a signal to force an output from the vehicle control system. The signal may configured to force the output from the vehicle control system on or off. In one embodiment, the vehicle diagnostic system is configured for transmitting the signal directly to one of the engine controller, the transmission controller, and the brake controller to force the output from the one of the engine controller, the transmission controller, and the brake controller. In another embodiment, the vehicle diagnostic system is configured for transmitting the signal to the primary vehicle controller to instruct the primary vehicle controller to force the output from the one of the engine controller, the transmission controller, and the brake controller.

According to a further aspect, the vehicle has an operator cab configured to hold an operator, where the vehicle diagnostic system further includes a user input configured to accept input from the operator, and the display and the user input are located within the operator cab.

According to yet another aspect, the vehicle also has a fuel system configured for providing fuel to the engine and a fuel controller connected to the fuel system and configured to control the fuel system, where the fuel controller is connected to the network, and the primary vehicle controller is further configured to communicate with the fuel controller. The vehicle diagnostic system is further configured to display diagnostic information from the fuel controller and/or force outputs from the fuel controller.

According to a still further aspect, the vehicle further includes a body supported by the chassis, wherein the vehicle control system further includes a body controller connected to the body and configured to control the body. The body controller is connected to the vehicle network, and the primary vehicle controller is configured to communicate with the body controller. The vehicle diagnostic system is further configured to communicate with the body controller and to display diagnostic information from the body controller and/or force outputs from the body controller in the diagnostic mode.

According to an additional aspect, the vehicle diagnostic system is further configured to display active fault codes from at least the engine controller, the transmission controller, and the brake controller in the diagnostic mode.

Additional aspects of the disclosure relate to a vehicle having a chassis, wheels, a drivetrain, and a brake system as described above, as well as an operator cab supported by the chassis and configured to hold an operator. The brake system includes a main brake and a parking brake. The vehicle also includes a vehicle control system connected to the engine, the transmission, and the brake system and configured to control the engine, the transmission, and the brake system, and a vehicle network connected to the vehicle control system and configured to permit communication between components of the vehicle control system. The vehicle further includes a vehicle diagnostic system that includes a memory, a processor, and a user interface positioned within the operator cab and including a display configured for displaying information and a user input configured to receive input from the operator. The vehicle diagnostic system is connected to the vehicle network and configured to communicate with the vehicle control system. Additionally, the vehicle diagnostic system is configured to operate in at least a display mode and a diagnostic mode, where the vehicle diagnostic system is configured to display operating information regarding the vehicle in the display mode, and the vehicle diagnostic system is configured to display diagnostic information from the vehicle control system in the diagnostic mode. The vehicle diagnostic system is also configured to continuously monitor whether the vehicle is stationary and the parking brake is engaged, and the vehicle diagnostic system is configured such that the diagnostic mode is only accessible through the user interface when the vehicle diagnostic system detects that the vehicle is stationary and the parking brake is engaged. The vehicle may further include any of the other features or components described herein.

According to one aspect, the vehicle diagnostic system is further configured to display active fault codes from at least the vehicle control system in the diagnostic mode.

According to another aspect, the vehicle diagnostic system is further configured to display error messages and warning messages during the display mode.

According to a further aspect, the vehicle diagnostic system is further configured to monitor all messages on the vehicle network and to display diagnostic information related only to specific messages pertinent to desired functionality. The system may use filtering to accomplish this function, for example, by filtering based on pre-defined headers included in the messages.

According to yet another aspect, the vehicle diagnostic system is configured for transmitting a signal to force an output from the vehicle control system. In one embodiment, the vehicle diagnostic system is configured for transmitting the signal directly to a component of the diagnostic system, e.g., one of the engine controller, the transmission controller, and the brake controller to force the output from the component. In another embodiment, the vehicle diagnostic system is configured for transmitting the signal to the primary vehicle controller to instruct the primary vehicle controller to force the output from the component.

Further aspects of the disclosure relate to a vehicle diagnostic system, configured for use with a vehicle as described above. The vehicle may include a computer-readable memory, a processor connected to the memory and configured to be connected to the vehicle network, and a user interface including a display connected to the processor and configured for displaying information and a user input configured to receive input from an operator. The vehicle diagnostic system is configured to operate in a diagnostic mode, in which the processor is configured to monitor messages from the vehicle control system on the vehicle network, identify specific messages from the vehicle control system on the vehicle network that are pertinent to desired functionality, and display diagnostic information related to the specific messages, via the display. As mentioned above, the identification of specific messages may be performed using filtering, e.g., based on pre-defined headers in the messages. The diagnostic system is further configured to receive an instruction from the operator through the user input, the instruction configured to force an output from at least one of the drivetrain and the brake system, and transmit a signal to the vehicle control system, in response to receiving the input, the signal configured to cause the vehicle control system to force the output from the at least one of the drivetrain and the brake system. The system may further include any of the other features or components described herein.

According to one aspect, the processor of the vehicle diagnostic system is further configured to continuously monitor whether the vehicle is stationary and the parking brake is engaged, through communication with the vehicle control system. The diagnostic system permits access to the diagnostic mode by the operator through the user interface when the vehicle is stationary and the parking brake is engaged, and access to the diagnostic mode by the operator through the user interface is prevented when the vehicle is not stationary and/or the parking brake is not engaged.

According to another aspect, the processor monitors all messages from the vehicle control system on the vehicle network.

According to a further aspect, the vehicle further includes a fuel system, and the vehicle control system is connected to the fuel system and configured to control the fuel system.

Still further aspects of the disclosure relate to a computer-assisted method that is performed using computer hardware (e.g., a processor, memory, and/or display). The method may include any or all of the steps and functions described above. Aspects of the disclosure may also relate to a tangible and/or non-transitory computer readable medium including computer-executable instructions configured to cause a computer device to perform such a method.

Other features and advantages of the invention will be apparent from the following description taken in conjunction with the attached drawings.

BRIEF DESCRIPTION OF THE DRAWINGS

To understand the present invention, it will now be described by way of example, with reference to the accompanying drawings in which.

Figure 1:
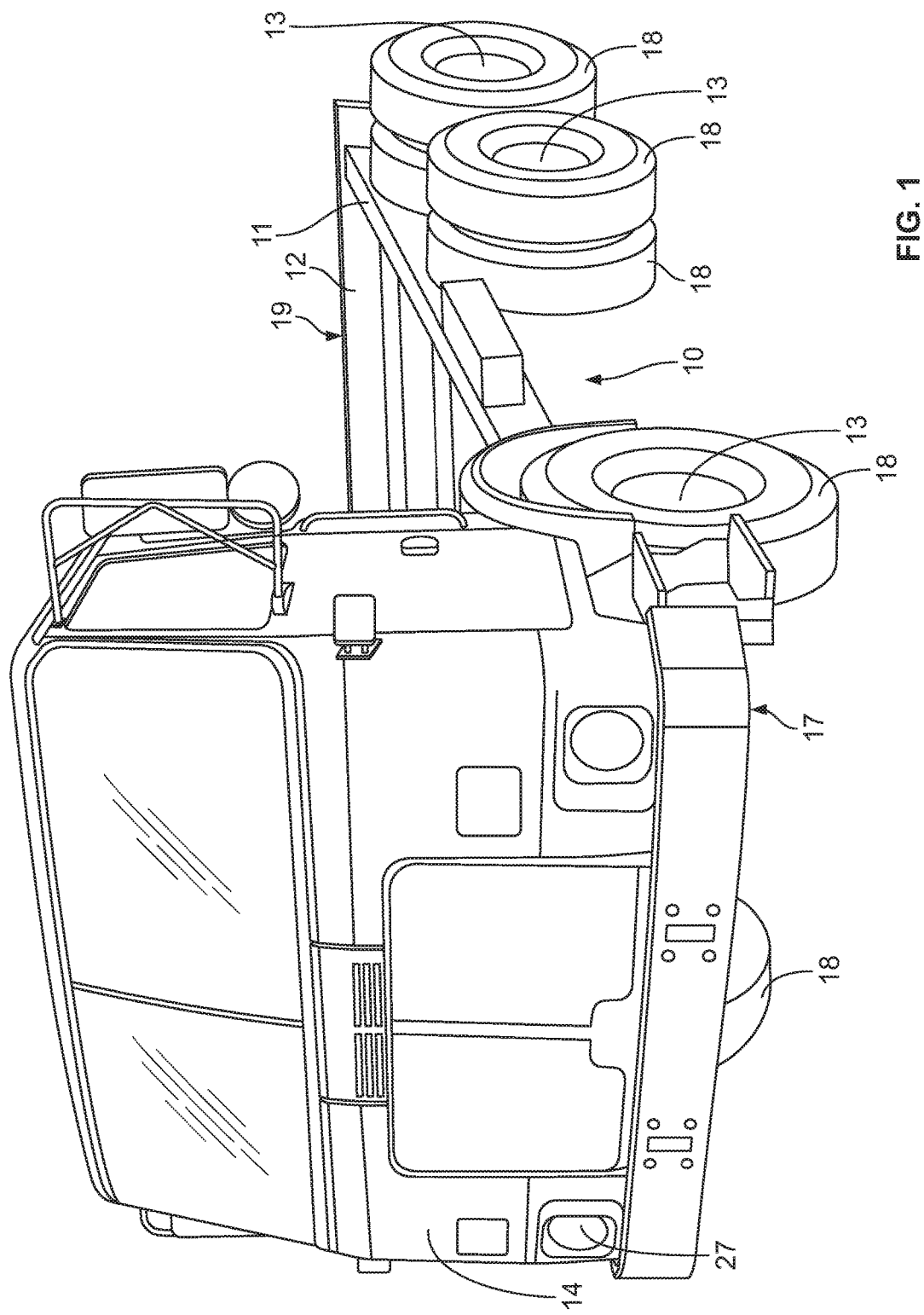
FIG. 1 is a perspective view of a vehicle according to aspects of the present invention.

It is understood that certain components may be removed from the drawing figures in order to provide better views of internal components.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

Figure 2:
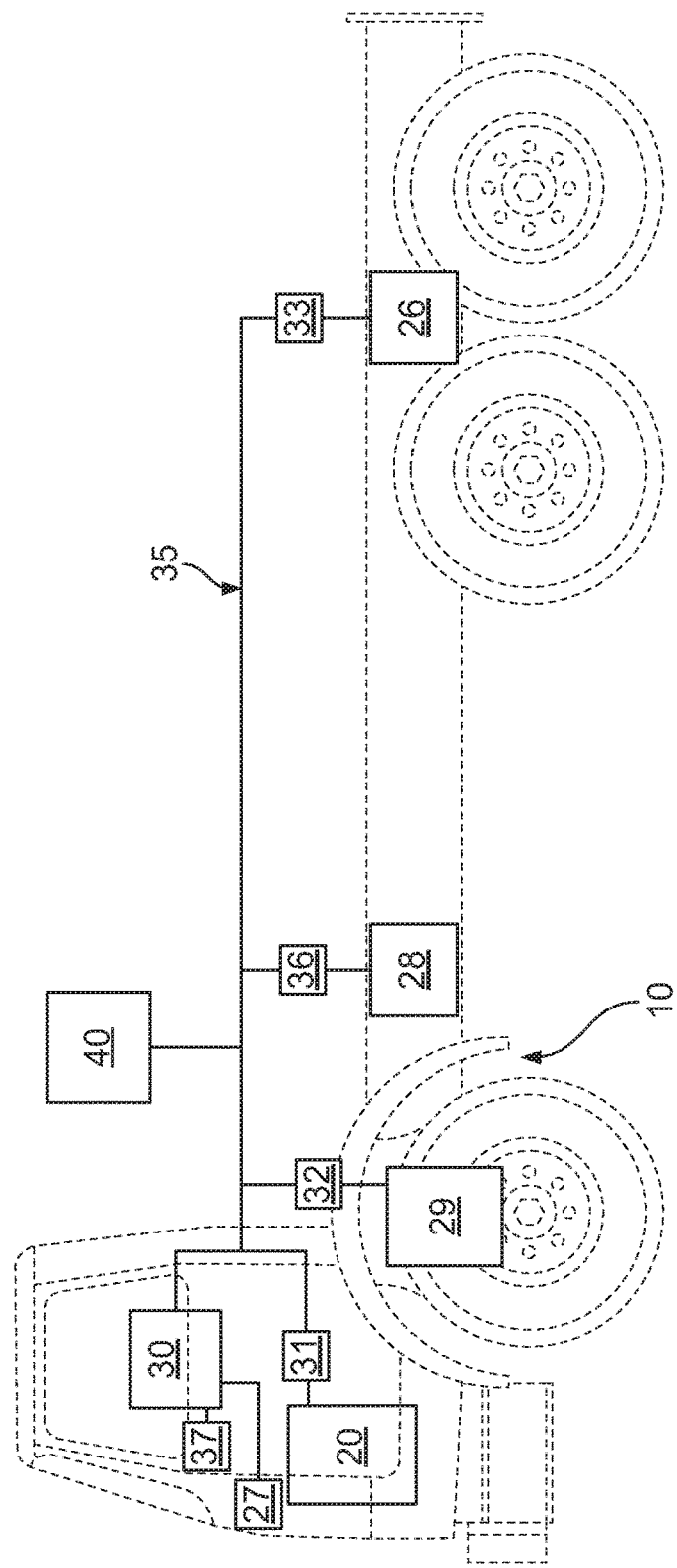
FIG. 2 is a schematic side view of the vehicle of FIG. 1, shown in broken lines, as well as an internal communication network, with some components of the vehicle being connected to the network, and a vehicle diagnostic system connected to the network, according to aspects of the present invention.

Referring now in detail to the Figures, FIGS. 1-2 illustrate a vehicle of the present invention, generally designated with the reference numeral 10. In one embodiment, the vehicle is in the form of a refuse hauling truck. It is understood that aspects and features of the present invention can be incorporated into various types of vehicles including other heavy-duty vehicles, medium-duty vehicles or light vehicles of various applications.

The vehicle 10 generally includes a chassis 12 supporting an operator cab 14 and a vehicle body 16. When assembled, the body 16 and the operator cab 14 are mounted on the chassis 12. The chassis 12 is a truck chassis and may have frame members or rail members 11, and the chassis 12 has a front portion 17 for supporting the operator cab 14 and a rear portion 19 for supporting the body 16. In one embodiment, the rail members 11 are made from steel and are generally rectangular in cross-section (e.g., a C-section). The rail members 11 may extend substantially the entire length of the chassis 12 in one embodiment, and may serve as points of support and/or connection for the body 16, the cab 14, the axles 13, and other components. As is known in the art, the chassis 12 has a front axle 13 and one or more rear axles 13 which in turn are attached to wheels 18 for movement of the chassis 12 along a surface. Additionally, as shown in FIGS. 1-4, the vehicle 10 includes a drivetrain that includes an engine 20 connected to a transmission 29 (both shown schematically) configured to transfer power to at least one of the wheels 18. The transmission 29 may be connected to one or both rear wheels 18 in one embodiment, but it is understood that the transmission may be connected to transfer power directly to any number of the wheels 18, including, additionally or alternately, one or more of the front wheels 18 in some embodiments. It is understood that the transmission 29 may allow shifting between several settings (e.g. D, N, R) and several gears (e.g. various forward-drive gear ratios). Additional components connected to the engine 20 may be included as well, including an exhaust pipe, an air cleaner assembly, etc. The vehicle 10 may further include components such as a brake system 26, e.g., an anti-lock brake system (ABS), which is connected to the wheels 18 and configured to slow and stop the vehicle 10 from rolling, as well as a light system 27, which may include various lights and blinkers.

Figure 1A:
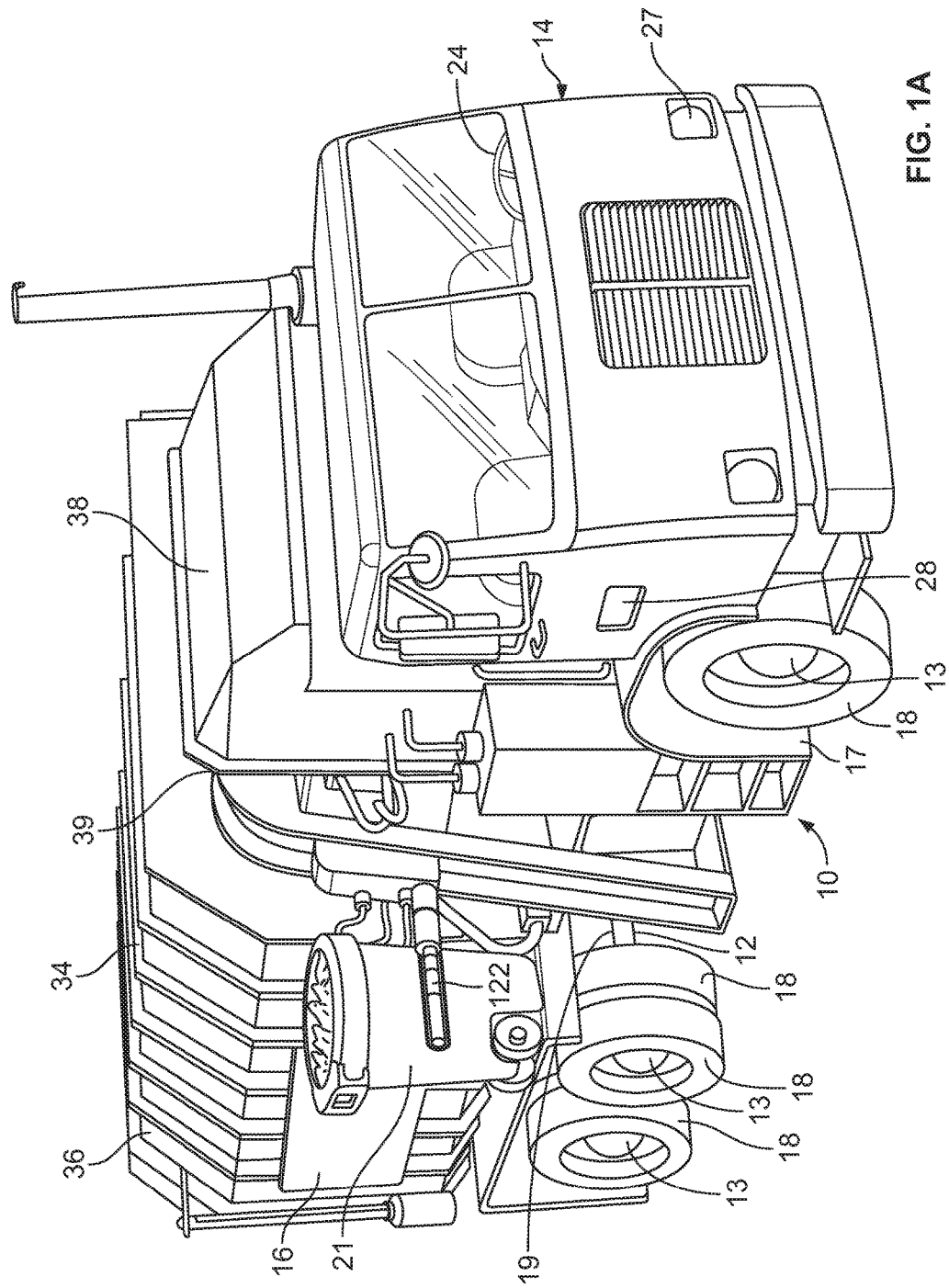
FIG. 1A is a perspective view of the vehicle of FIG. 1 with a body connected to the vehicle, in the form of a refuse truck.

The chassis 12 may receive several different configurations of the body 16, having various functionalities. As illustrated in FIG. 1A, in an exemplary embodiment for a refuse truck, the body 16 includes a storage area 34, a loading area 123, a reception area 38, an open hopper 39 and a moveable arm 122. Refuse 21 may be loaded in the reception area 38 by use of the arm 122. Refuse is stored in the storage area 34 and generally compacted within the body 16. However, as understood by those of skill in the art, other bodies for different purposes such as front loaders, rear loaders, dump trucks, straight trucks, cement trucks, pumpers, sweepers and other applications may be used in connection with the present invention. Numerous components of the body 16 are capable of being adjusted, manipulated or otherwise actuated such as lifting the axles, manipulating the arm 122, opening the hopper 39, and compacting.

Figure 3:
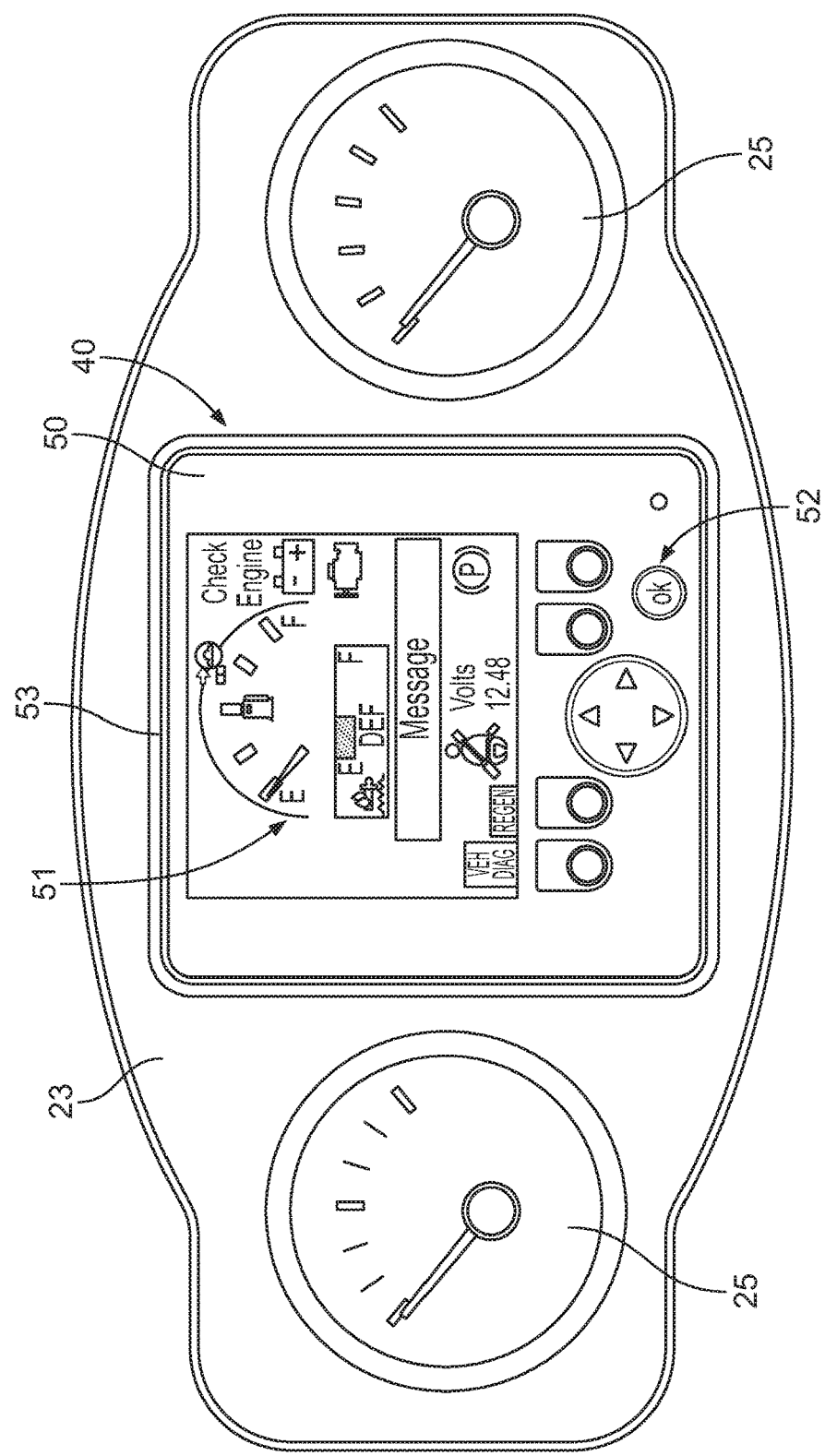
FIG. 3 is a view of a display of a vehicle diagnostic system according to aspects of the present invention, mounted within a dashboard of a vehicle.
Figure 4:
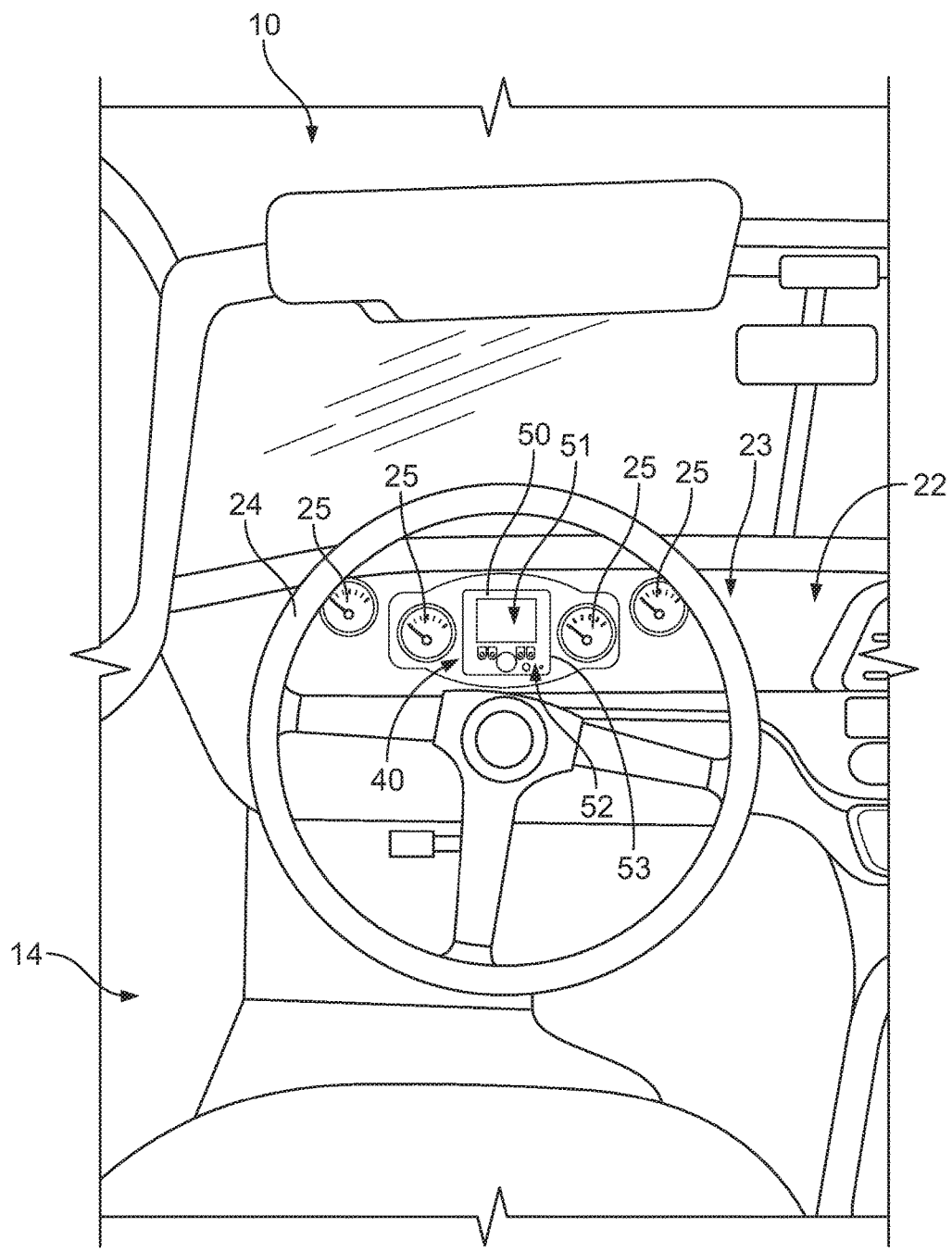
FIG. 4 is a plan view of an operator area of the vehicle, showing the display and the dashboard of FIG. 3.

The operator cab 14 generally includes passenger area, which in the embodiment of FIGS. 1-4, includes both a left area and a right area. The vehicle 10 may be operable in a left and/or right hand drive configuration, and may be switchable between such configurations, and the left and right areas may be configured for one or more operators or passengers, depending on the drive configuration. The operator cab 14 may also contain controls 22 for operating and monitoring the vehicle 10, some of which may be located on a dashboard 23, such as a steering wheel 24 and various gauges/meters 25, as shown in FIG. 4. The controls 22 may also include various switches, controls, displays, etc., including for example an ignition switch, a speedometer and/or other monitors, and a transmission control (e.g. a stick or a push-button control), which may be located on or in the dashboard 23 and/or a console separating the left and right areas of the cab 14. The controls 22 may further include actuators for a main or service braking system, which may be air brakes in one embodiment, a parking brake system, or a throttle (e.g., an accelerator), as well as controls for lifting the axles, manipulating the arm 122, opening the hopper 39, compacting, etc. At least some of such controls 22 may be integrated into and/or controlled by a vehicle control system, as described herein.

The vehicle 10 generally includes a vehicle control system, which includes a primary vehicle controller 30, as well as various controllers configured for controlling specific components of the vehicle 10. For example, in one embodiment as shown in FIG. 2, the vehicle control system may include an engine controller 31 configured to control the engine 20, a transmission controller 32 configured to control the transmission 29, and a brake controller 33 configured to control the brake system 26 of the vehicle 10. In other embodiments, the control system may include additional or alternate controllers that are configured to control other components of the vehicle. For example, if the vehicle has a compressed natural gas (CNG) fuel system 28, the vehicle 10 may also include a fuel controller 36 to control the fuel system 28. This embodiment is also illustrated in FIG. 2. Additionally, the control system may include other controllers, such as body controls 42 (see FIG. 7), a GPS data monitoring system, etc. The vehicle 10 may also include an internal communication network 35 that is generally in communication with the various components of the vehicle control system, including the various controllers 30, 31, 32, 33, 36, allowing the components of the control system to communicate with each other and with other systems via the network 35. The network 35 may be a J1939 databus network in one embodiment, and may be configured for wired and/or wireless data communication. The vehicle control system may also be connected to various instrumentation 37 (e.g., the gauges 25), at least some of which may be visible and/or accessible from within the operator cab 14 for communicating information to the user, such as information regarding the operation of various vehicle systems and components. The vehicle control system may further include a secondary vehicle controller (not shown) in one embodiment, which may be configured with its own logic structure, but may report directly to the primary vehicle controller 30 rather than to the network 35 and/or may be controlled by the primary controller 30 reporting directly onto the primary vehicle databus. It is understood that the secondary vehicle controller may be considered to be an extension of the primary vehicle controller 30 in some embodiments.

Figure 5:
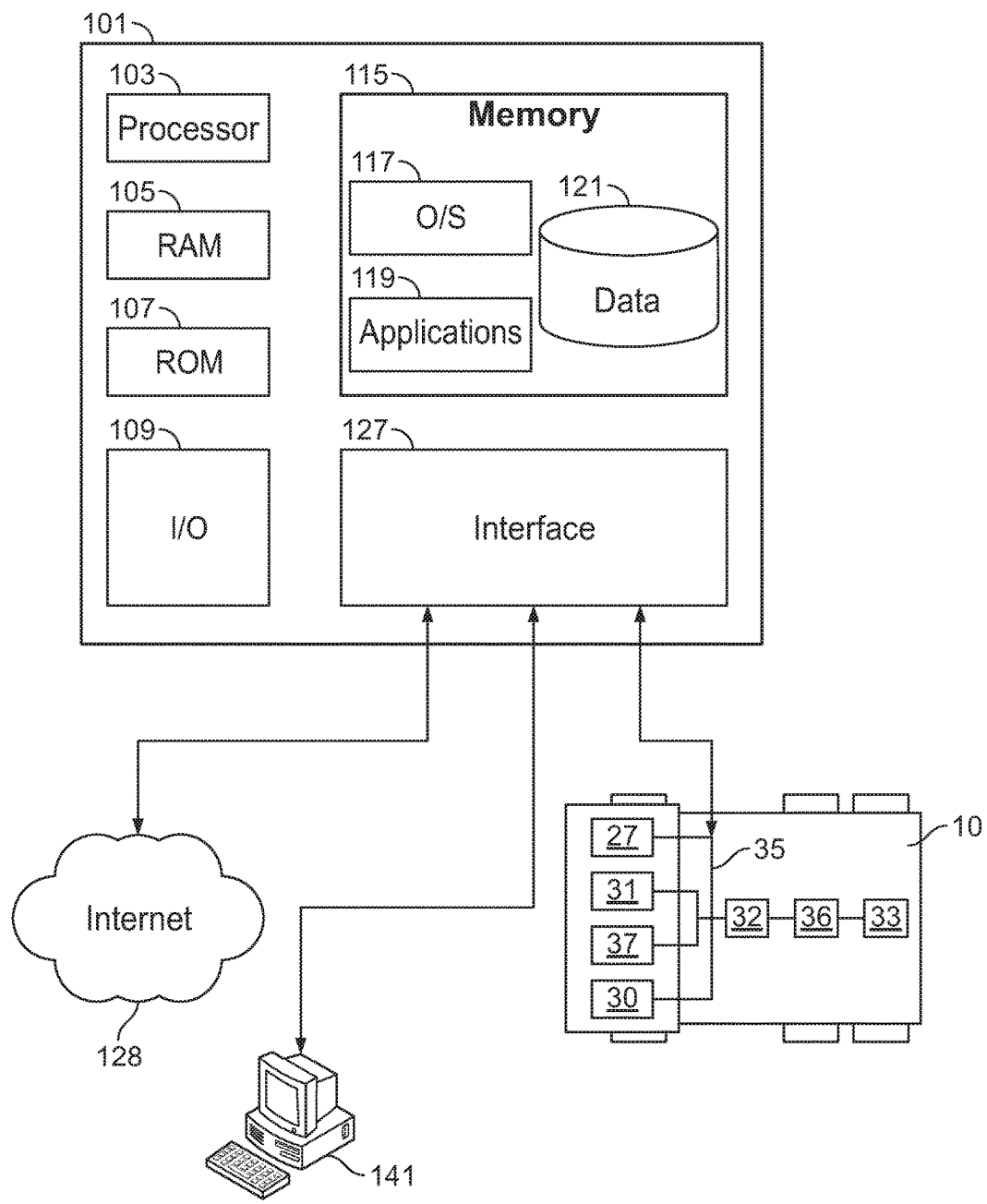
FIG. 5 is a schematic diagram showing one embodiment of a vehicle diagnostic system according to aspects of the present invention.

In one embodiment, the vehicle 10 includes a vehicle diagnostic system 40 that is connected to the network 35 and configured for communication with the various controllers 30, 31, 32, 33 of the vehicle control system. FIG. 5 illustrates a block diagram of a computer device or computer system 101 that may be used according to an illustrative embodiment of the diagnostic system 40. As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more tangible and/or non-transitory computer-readable storage media having computer-readable program code, or instructions, embodied in or on the storage media. Any suitable tangible and/or non-transitory computer readable storage media may be utilized, including hard disks, CD-ROMs, optical storage devices, magnetic storage devices, and/or any combination thereof. In addition, various intangible signals representing data or events as described herein may be transferred between a source and a destination in the form of electromagnetic waves traveling through signal-conducting media such as conductive (e.g. metal) wires, optical fibers, and/or wireless transmission media (e.g., air and/or space).

The computer system 101 may have a processor 103 for controlling overall operation of the computer system 101 and its associated components, including RAM 105, ROM 107, input/output module 109, and memory 115. I/O 109 may include a user input device through which a user of computer system 101 may provide input, such as a microphone, keypad, touch screen, other types of buttons, mouse, and/or stylus, and may also include one or more of a speaker for providing audio output and a video display device for providing textual, audiovisual and/or graphical output. The I/O 109 may also include equipment for collecting other forms of information or input, such as a device for collecting biometric input and/or audio input, a barcode reader or other device for collecting graphic input, or other type of input device. In one embodiment, the I/O may be at least partially embodied by a dashboard user interface 50 that provides both input and output interfaces for the user, as illustrated in FIGS. 3-4 and described in greater detail herein.

Software may be stored within memory 115 and/or other storage to provide instructions to processor 103 for enabling the computer system 101 to perform various functions, including functions relating to the methods described herein. For example, memory 115 may store software used by the computer system 101, such as an operating system 117, application programs 119, and an associated database 121. Alternatively, some or all of the computer executable instructions may be embodied in hardware or firmware (not shown). As described in detail below, the database 121 may provide centralized storage of vehicle information. It is understood that the memory 115 may store vehicle information that is not in database format, and that the memory 115 may include temporary and/or permanent memory. It is also understood that a computer system 101, single processor 103, and single memory 115 are shown and described for sake of simplicity, and that the computer system 101, processor 103, and memory 115 may include a plurality of computer devices or systems, processors, and memories respectively, and may comprise a system of computer devices, processors, and/or memories.

The computer system 101 may be configured to operate in a networked environment supporting connections to one or more other computer devices 141. Such other computer devices 141 may include any of the components and features of the computer system 101 described herein and illustrated in FIG. 5, as well as other features. The other devices 141 may be any suitable type of computer device, such as personal computers, servers, mobile devices, and any other conceivable type of computer component or device, that include many or all of the elements described above relative to the computer system 101. The device 101 may include various network connections for connection to the other devices 141, such as a wide area network (WAN), a local area network (LAN), a cellular/mobile network, and other communication paths. One or more communications interfaces 127 generally provide connections to these various networks. When used in a LAN networking environment, the computer system 101 is connected to the LAN through a network interface or adapter. When used in a WAN networking environment, the computer system 101 may include a modem for establishing communications over the WAN, and may also include transceivers for Wi-Fi, Bluetooth, infrared or other optical communication, near field communication (NFC), among other means. Connection to a cellular/mobile network may be provided, for example, by a GSM/TDMA service provider. The other communication paths mentioned can include direct communication, such as by Bluetooth or Wi-Fi. Use of a WAN can provide connection to the Internet 128, and it is understood that other communication paths, such as cellular/mobile network can also provide Internet connectivity. It is understood that the computer system 101 can connect to one or more of the other devices 141 through more than one of such networks. It will be appreciated that the network connections shown are exemplary and other means of establishing a communications link between the computers may be used. The existence of any of various well-known protocols is presumed. Additionally, an application program 119 used by the computer system 101 according to an illustrative embodiment may include computer executable instructions for invoking user functionality related to various communication techniques.

The computer system 101 may be configured for communication with the vehicle control system through the interface 127 as well. As shown in FIG. 5, the computer system 101 is configured for communication with various vehicle components, including the various controllers 30, 31, 32, 33, 36 of the vehicle control system, as well as the light system 27 and the vehicle instrumentation 37. It is understood that the computer system 101 may be in communication with additional components and/or may not communicate with some of the illustrated components, in further embodiments.

As described above, aspects of the systems and methods described herein may be described in the general context of computer-executable instructions, such as program modules, being executed by a computer. Generally, program modules include routines, programs, objects, components, data structures, and the like, that perform particular tasks or implement particular abstract data types. Such a program module may be contained in a tangible and/or non-transitory computer-readable medium, as described above. The systems and methods described herein may also be practiced in distributed computing environments where tasks are performed by remote processing devices that are linked through a communications network. In a distributed computing environment, program modules may be located in the memory 115, which may include both local and remote computer storage media including memory storage devices. It is understood that connections and communications disclosed herein may be made by any type of wired or wireless connection or communication.

In one embodiment, the vehicle diagnostic system 40 is configured to operate by monitoring all messages on the network 35, but is programmed only to take action on specific messages from specific controllers or other components that contain information pertinent to desired functionality. Vehicle information of desired types that is collected from the network 35 by the diagnostic system 40 are stored into either temporary or permanent memory 115, depending on circumstances, such as functional requirements, the nature of the information, etc. For example, information such as vehicle speed is recorded into temporary memory due to the nature of the information, as it is frequently changing and dismissive when the vehicle is not running. As another example, information on vehicle hours and distance traveled over a certain amount of time may be stored into permanent memory and accessed as desired. In an embodiment where the primary vehicle controller 30 has a subservient secondary vehicle controller, the diagnostic system may receive information on the secondary vehicle controller via messages from the primary vehicle controller 30. In one embodiment, the diagnostic system 40 may not include any specialized or dedicated inputs or outputs for communication with other components of the vehicle 10, and may receive and transmit all information from and to other vehicle components through a single connection to the network 35.

Additionally, many of the components of the vehicle control system may send out the same messages (e.g., via SAE defined headers) at times. In this situation, the diagnostic system 40 may be configured to filter out the message from the most pertinent source of information for the data that is required and to ignore similar messages from other components.

The diagnostic system 40 is also configured to broadcast messages over the network 35, to interface with the other components on the network 35. For example, the diagnostic system 40 may broadcast a request for information from one or more other components on the network 35 that is not normally broadcast from such component(s). As another example, the diagnostic system may broadcast control messages to one or more other components on the network 35, such as a request for manual DPF regeneration. As a further example, the diagnostic system 40 may broadcast one or more proprietary messages to the primary vehicle controller 30 to relay command information on the forcing on of outputs. Such outputs may include outputs that are controlled by the primary vehicle controller 30 and/or the secondary vehicle controller, if present. Examples of such outputs include, without limitation, lighting controls, lift axle controls, neutral and reverse power outputs, and starter solenoid power, among others. These transmissions of the diagnostic system 40 may be initiated manually, such as via a button on the user input 52, or automatically, or a combination of such techniques. It is understood that the outputs forced may be or result in functional and/or physical operations of components of the vehicle 10.

The diagnostic system 40 may include a user interface 50 that is located within the operator cab 14 and is configured for transmitting information to the user and receiving input from the user. One embodiment of the user interface 50 is illustrated in FIGS. 3-4, and is in the form of a module 53 located on or in the dashboard 23 of the vehicle 10. It is understood that the module 53 may be located elsewhere in other embodiments, such as within a console within the operator cab 14, and that the module 53 may be connected to portions of the vehicle 10 such as by embedding within various components (e.g., the dashboard as shown in FIGS. 3-4), mounting on top of various components, etc. The user interface 50 includes a display 51 that is configured to provide a visual display for the user, and a user input 52 that is configured to receive input from the user. The display 51 includes a video display in the embodiment illustrated in FIGS. 3-4, and may also include audio output for generating audio signals, such as alarms, indications of confirmation, etc. The user input 52 includes several tactile buttons in the embodiment illustrated in FIGS. 3-4, and may additionally or alternately include other input, such as a touch screen. The user interface 50 may include further components for user interaction in further embodiments. Additionally, the module 53 for the user interface 50 may include some or all of the computer components of the diagnostic system 40, such as the memory 115, the processor 103, the interface 127, etc., illustrated in FIG. 5, and that the module 53 may perform some or all of the actions and methods described herein with respect to the diagnostic system 40. In one embodiment, the user interface 50 provides all of the functionality of the diagnostic system 40 within the module 53. It is understood that some of the components of the computer system 101 may be located elsewhere in certain embodiments.

In one embodiment, the vehicle diagnostic system 40 has two main modes of operation: display mode and diagnostic mode. Display mode is the standard interface where the user interface 50 displays vehicle information on warning indicators and vehicle parameters that are required or desirable to communicate to the operator of a moving vehicle 10. This vehicle information may include, but is not limited to: turn signals, high beams, ABS errors, engine errors, emission warnings, transmission errors, and fuel system errors. The user interface 50 may be configured to display information in the form of gauges/meters or other forms. In one embodiment, information on up to four different gauges is displayed on the screen of the display 51, depending on the application. For example, the display 51 may show the fuel level and/or diesel exhaust fluid (DEF) level. As another example, the user interface 50 may display information on the voltage level of the battery of the vehicle 10 and/or a two-line display that lists 15-20 vehicle parameters read from the network 35 that are scrollable via the user input 52 on the module 53. In a CNG vehicle where the diagnostic system 40 receives information from the fuel controller 36, the display 51 may show the fuel level as the sweeping gauge, and may also show a direct digital reading of the fuel pressure below the gauge.

In one embodiment, the information on the display 51 may be at least partially replaced by warning messages when specific urgent events occur, in order to gain the operator's attention. Such warning messages may include a stop engine alert, a communication error with one or more controllers on the network 35, high transmission temperatures, high aftertreatment soot level, etc. These warning messages may stay highlighted until the warning(s) are clear. Additionally, in a CNG vehicle, the user interface may show a large warning message, which takes the space of most of the display 51, whenever the fueling door is open, to indicate that the fueling door is open and that the vehicle 10 will therefore not start. This message may go away as soon as the fuel nozzle is removed and the fueling door is closed. In one embodiment, at least some warning messages described herein may also be manually clearable by the operator using the user input 52, and/or some messages may specifically be configured not to allow manual clearing by the operator. In other embodiments, at least some of the displayed warnings may be accompanied by (or even replaced by) a different type of warning, such as an audible alarm.

Figure 6:
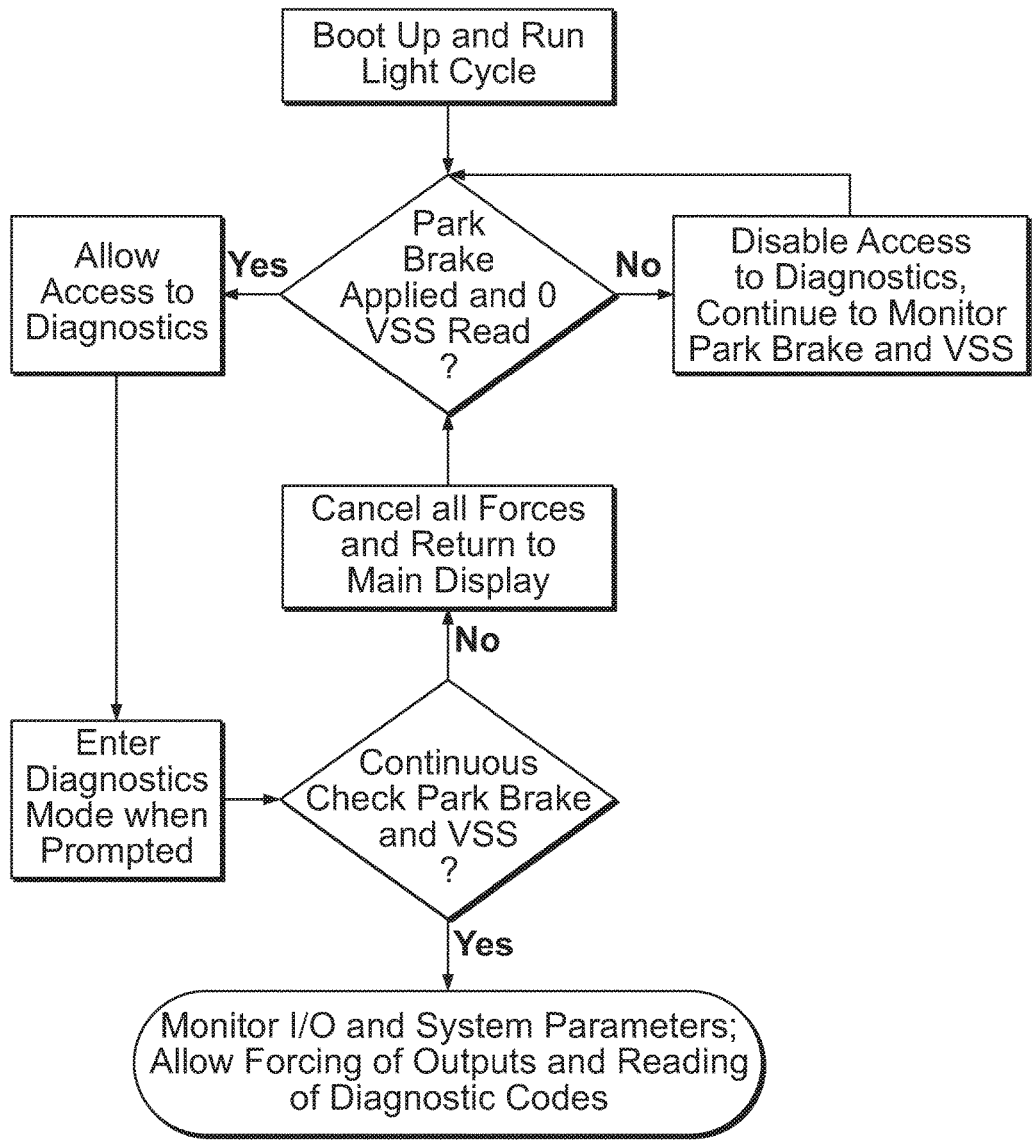
FIG. 6 is a flow diagram illustrating a processing method that may be executed by one embodiment of a vehicle diagnostic system according to aspects of the present invention.

The diagnostic mode of the diagnostic system 40 allows access to view diagnostic information on the entire vehicle system, including monitoring system parameters and reading of diagnostic codes, and also provides for the operator to select different outputs to be forced. Forcing on and off of outputs may be performed by transmitting a signal directly to the component to be controlled (e.g., the transmission controller 32) in some configurations. However, in one embodiment, at least some forcing of outputs may be performed by transmitting a signal to the primary vehicle controller 30, which may further instruct an appropriate component or other controller. For example, in one embodiment, the engine controller 31 may be configured to only accept instructions from the primary vehicle controller 30, which requires the diagnostic system 40 to go through the primary vehicle controller 30 to force outputs for the engine controller 31. In one embodiment, the diagnostic mode may not be accessible to the operator while operating the vehicle, for safety reasons. For example, the diagnostic mode may be accessible when the vehicle is stationary and the park brake is applied, such as by an icon displayed for selection on the display 51, where the operator can select the icon using the user input 52 to gain access to the diagnostics menu, causing the user interface to switch to the diagnostic mode. This is illustrated in FIG. 6, which depicts one embodiment of a method for operating the diagnostic system. As shown in FIG. 6, the diagnostic system 40 may have a continuous check to ensure the vehicle is not moving, in order to remain in diagnostic mode. For example, the diagnostic menu may be automatically exited, and any forced output information nullified, whenever the park brake is released and/or the vehicle velocity is not zero, returning to the display mode.

The diagnostic mode may be exited manually as well, and exiting the diagnostic mode by any means may transfer the user interface 50 back to the display mode.

In one embodiment, the primary diagnostic screen lists the vehicle VIN number (which may be read from the engine controller 31 over the network 35) and the engine serial number, when available. The buttons on the user input 52 then allow the user to scroll through the selected diagnostic system options to review information of the system component of choice. In one embodiment, the menu may have a vehicle diagnostics selection, which provides another submenu for the specific vehicle functionality that is desired, among the multiple subsystems of the vehicle control systems that can be diagnosed, for example, lighting or engine starting/running information. The vehicle diagnostics submenu may also display information on the revision level of the software for the module 53 as well as the primary vehicle controller 30 and information on whether the secondary vehicle controller (if present) is online and its revision level (if applicable). Inside the vehicle diagnostics submenus, inputs and outputs to the vehicle control systems may be listed by signal descriptions and have visual indication of whether the circuits are active or not. Analog inputs that are resistive or voltage based may be configured to display the real time value of the signal that is being read by the primary vehicle controller 30 and/or the diagnostic system 40. One or more menus in diagnostic mode may include potential forced outputs of the diagnostic system, which can be selected by the user input 52. Such outputs may remain forced-on until switched off either manually, or by the diagnostics mode being exited by any means (including automatically, as shown in FIG. 6). Further, the diagnostic mode may provide for user-selected toggling of the input and output signal description text, with text indicating which connector pin of the of the primary (or secondary) vehicle controller 30 that the wire for that particular function is connected to. In one embodiment, the diagnostic mode may provide an additional submenu for settings of the user interface 50, and the number of settings available may depend on the application. For example, the user interface 50 may be adjusted between English and metric data information. For CNG vehicles, where the diagnostic system 40 receives information from the fuel controller 36, the diagnostic mode may also provide a setting to set the maximum tank pressure of the CNG gas tank, which allows for better accuracy of the diagnostic system 40 for fuel level/pressure reading.

In one embodiment, the diagnostics mode may also provide a separate diagnostic menu for each of the other major components on the vehicle (e.g., the engine controller 31, the transmission controller 32, the ABS controller 33, etc.) that displays information specific to each respective component, which may be accessible on the main diagnostics menu screen. The engine diagnostic menu may contain information on engine specific parameters, for example, fan state or coolant level, as well as inputs and outputs that are specific to engine control functionality, for example, analog throttle input settings and cruise control switch states. As another example, the engine diagnostic menu may include a selection to provide access to another submenu that displays information on any active fault codes for the engine 20. Such a submenu may display fault codes according to standard SAE defined fault code information (SPN and FMI number), along with the engine manufacturer's fault code number and/or the full description of the indicated fault. The description provided by the diagnostic system 40 may include more information than is provided by the SPN and FMI defined codes, in one embodiment. If multiple faults are present with the engine controller 31, the user interface 50 may provide for selection or scrolling through different active fault codes, or may alternately display multiple fault codes simultaneously. As a further example, the engine diagnostic menu may display one or more real time parameters which monitor and display the total number of engine running hours since the engine last ran without any active faults. The engine diagnostic menu may provide further information, menus, and options in further embodiments.

The transmission diagnostic menu may display diagnostic information read from the transmission controller 32, and may also display the calibration number that the transmission control module was programmed to. For example, the transmission diagnostic menu may display information covering a range of transmission functions, such as whether a shift inhibit is present, gear information, transmission retarder status, and PTO information. As another example, the transmission diagnostic menu may display information regarding how many fault codes are present with the transmission controller 32, as well as the SAE defined SPN and FMI codes, which identify the specific component where the fault has occurred and a general description of the fault, respectively. In one embodiment, the transmission diagnostic menu may not provide full details on the code information beyond the SPN and FMI codes, as this information may be duplicated in the vehicle shift pads. However, in another embodiment, the transmission diagnostic menu may provide information in the level of detail described above with respect to the engine diagnostic menu. The transmission diagnostic menu may provide further information, menus, and options in further embodiments.

The brake diagnostic menu may display diagnostic information read from the brake controller 33. For example, the brake diagnostic menu may display fault code information, which may be presented in the same manner as the engine diagnostic menu fault code information (e.g., SPN and FMI), with full descriptions of each fault. As similarly described above, the description provided by the diagnostic system 40 may include more information than is provided by the SPN and FMI defined codes, in one embodiment. As another example, the brake diagnostic menu may display the software version number of the brake controller 33. As a further example, the buttons on the user input 52 may each be tied to functionality with the brake controller 33, to reset active faults, enter dyno test mode, and run through an automatic reconfiguration of the brake controller 33. The brake diagnostic menu may provide further information, menus, and options in further embodiments.

The diagnostic system 40 may provide a vehicle performance menu that monitors and/or displays vehicle performance parameters over a defined time period of operation, in one embodiment. This menu may be accessed via the diagnostic mode in one embodiment. For example, the vehicle performance menu may contain information such as the number of reverse transitions, retarder applications, PTO fuel usage, brake applications, and PTO applications over a set time period (e.g., 40 hours) of vehicle operation. The data for each parameter may further be broken down into usage over smaller time periods, e.g. a current 8 hour cycle, the previous 8 hour cycle, and overall last 40 hours of vehicle operation. The vehicle performance menu may further include an additional data field that displays a resettable reading of PTO fuel usage, which enables the end user to record a date and time to reset this data and then return at a later time to determine how much fuel was used over that given period. The vehicle performance menu may provide further information, menus, and options in further embodiments.

The diagnostic system 40 may further have a light checking function in one embodiment, whereby the diagnostic system 40 commands the lighting system 27 to cycle all of the lights of the vehicle 10 to ensure that all lights are functional. In one embodiment, the light checking function may be manually activatable, such as through the user input 52 and the diagnostic menu. The light checking function may additionally or alternately occur automatically in another embodiment, such as upon boot-up of the system and/or based on a different event. The diagnostic system 40 may initiate the light checking function by instructing the primary vehicle controller 30 to initiate a subprogram that will cycle through all of the vehicle lights controlled by the system (i.e., at least all primary lighting). In one embodiment, the cycle starts at the front left of the vehicle 10, and each light stays on for a few seconds before switching over to the next light function. The purpose of this feature is to allow quick and easy inspection of all of the lights on the vehicle 10 by a single user without having to manually activate each light before checking it.

Figure 7:
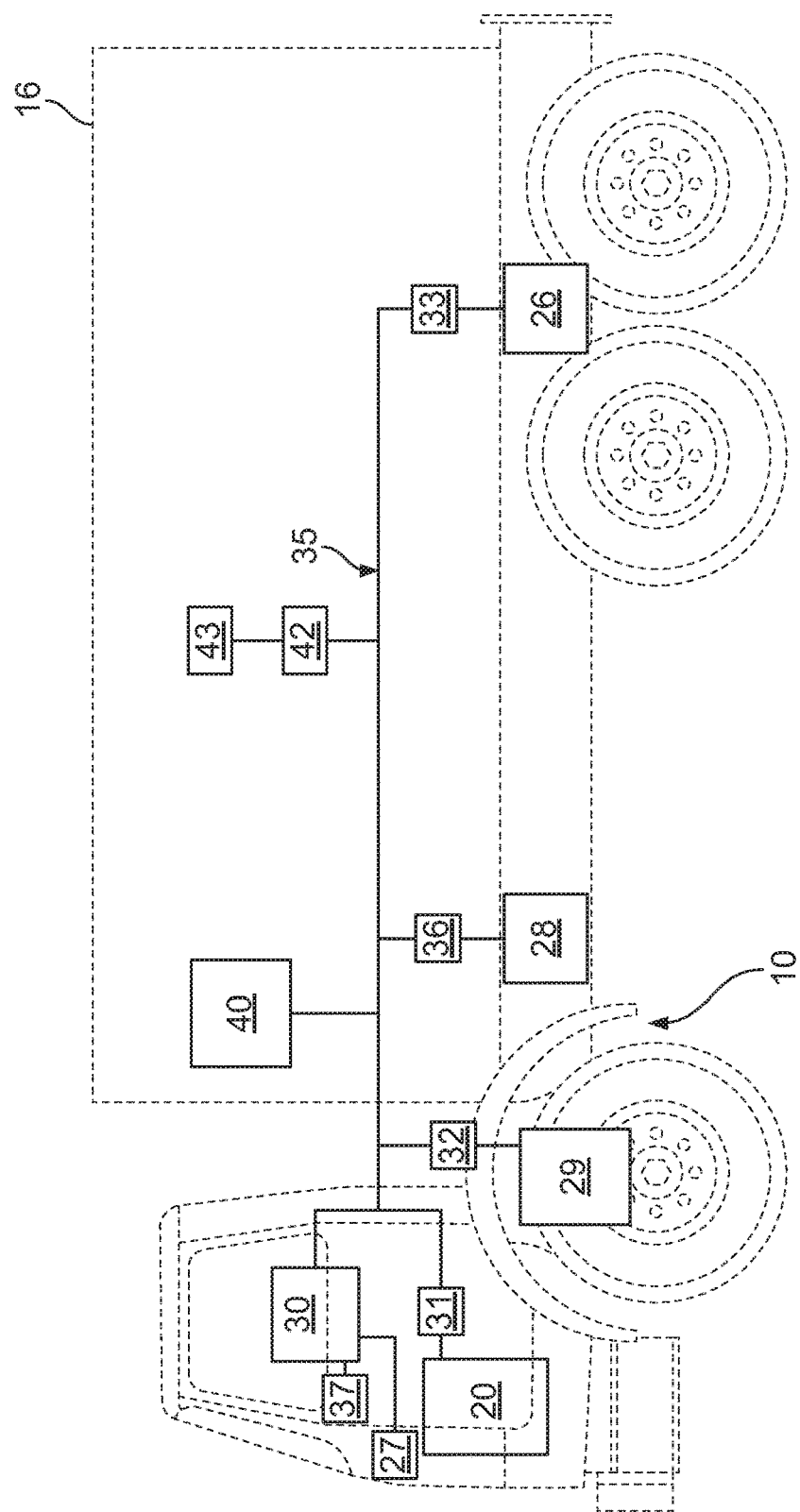
FIG. 7 is a schematic side view of the vehicle of FIG. 2, additionally including a body shown in broken lines, with body controls connected to the network.

The diagnostic system 40 may provide further functionality in other embodiments. For example, the vehicle may be provided with additional systems and/or additional controllers and monitors for such systems, and the diagnostic system 40 may be configured to monitor messages from such systems and/or force outputs with respect to such systems. It is understood that the diagnostic system 40 may be configured to interact with any components that communicate over the network 35, including future technologies and components that have not yet been developed. As another example, the diagnostic system 40 may be configured to transmit any collected data to another computer device 141, as shown in FIG. 5, for use in various applications, monitoring, analysis, etc. As a further example, any controllers or other computer devices controlling or monitoring the characteristics of the vehicle body 16 (i.e., a body control system) may be connected to the network 35 or otherwise communicate with the diagnostic system 40, and the diagnostic system 40 may interact with the body control system in manners similar to those described above, such as monitoring performance and status, forcing outputs, etc. FIG. 7 illustrates one embodiment of a vehicle 10 as shown in FIG. 2, and further including a body controller 42 connected to the network 35 and configured to control one or more operations or components 43 of the body 16. It is understood that the operations or components 43 controlled by the body controller 42 may depend on the structure, operation, and functionality of the body 16. In one embodiment, as shown in FIG. 1A, the vehicle 10 may be in the form of a refuse truck, and the body 16 may have functional operations and/or components 43 to accomplish refuse hauling functions, such as the components illustrated in FIG. 1A and described herein. The body controller 42 may be connected to other components in the same manner as the other controllers 30, 31, 32, 33, 36 described herein, and may communicate and operate in the same manner. For example, the body controller 42 may communicate with and/or be controlled by the primary vehicle controller 30, and the body controller 42 may further broadcast messages over the network 35. As another example, the diagnostic system 40 may interact with the body controller 42 in the same manners described herein with respect to the other controllers 30, 31, 32, 33, 36, including displaying diagnostic and other information from the body controller 42, forcing outputs from the body controller 42, etc. Further functionality may be provided in further embodiments.

The embodiments of the diagnostic system described herein provide benefits and advantages over existing designs. For example, the diagnostic system provides increased communication of information to the operator of the vehicle, which enhances the operator's ability to operate the vehicle in the safest, most efficient, and most effective way. This increased communication of information includes the ability to view information from all of the different systems of the vehicle, the ability to customize the type and amount of information displayed, and the ability to provide such information in greater detail, such as greater detail for error codes and warnings. In some existing systems, information on error codes cannot be obtained without connecting an outside computer to the vehicle control system, which is more time consuming and less efficient, and does not allow immediate communication to the operator. This is particularly useful for heavy duty vehicles, as they are exposed to more rigorous conditions as compared to other types of vehicles. The ability to select the type and amount of information displayed is also useful for commercial vehicles, as the desired information can be changed depending on the end use of the vehicle. As another example, the diagnostic system provides increased ability for the operator to force outputs and control the vehicle, which further enhances the operator's ability to operate and maintain the vehicle in the safest, most efficient, and most effective way. As a further example, the diagnostic system can provide warnings, alerts, and other critical information in a form that is highly visible to the operator, such as by replacing at least a portion of the information on the display. This helps ensure that the information is noticed by the operator, who may not immediately notice that a gauge or meter is low or that a dashboard light has been activated, which is how such information is typically communicated in previous systems. As another example, the information collected by the diagnostic system may provide increased ability for the owner to monitor how efficiently the vehicle is being operated, which further enhances the owner's ability to ensure that the vehicles are being used as intended. Still other benefits and advantages are explicitly or implicitly described herein and/or recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention, and the scope of protection is only limited by the scope of the accompanying Claims.

What is claimed is:

1. A vehicle comprising:
   a chassis;
   a plurality of wheels connected to the chassis;
   a vehicle control system comprising a plurality of controllers configured for controlling different components of the vehicle, a vehicle network connected to the controllers and configured to permit communication to and from the controllers, and a primary vehicle controller connected to the vehicle network and configured to communicate with the controllers; and
   a vehicle diagnostic system comprising a memory, a processor, and a display, the vehicle diagnostic system connected to the vehicle network and configured to communicate with the controllers and the primary vehicle controller, wherein the vehicle diagnostic system is configured to operate in a diagnostic mode, in which the vehicle diagnostic system is configured to display diagnostic information from one or more of the controllers,
   wherein the vehicle diagnostic system is configured for transmitting a first signal to force a first output from the vehicle control system, and wherein a first controller of the plurality of controllers is configured to only accept instructions from the primary vehicle controller such that instructions from the vehicle diagnostic system to the first controller to force the first output are only communicated indirectly through the primary vehicle controller.

2. The vehicle of claim 1, further comprising a brake system comprising a main brake and a parking brake, and wherein the vehicle diagnostic system is configured such that the diagnostic mode is only accessible when the vehicle diagnostic system detects that the vehicle is stationary and the parking brake is engaged.

3. The vehicle of claim 2, wherein the vehicle diagnostic system is configured to continuously monitor whether the vehicle is stationary and the parking brake is engaged.

4. The vehicle of claim 1, wherein the vehicle diagnostic system is configured for transmitting a second signal directly to a second controller of the plurality of controllers to force a second output from the second controller.

5. The vehicle of claim 1, wherein the first signal is configured to force the first output from the vehicle control system on or off.

6. The vehicle of claim 1, wherein the memory, the processor, and the display of the vehicle diagnostic system are all located onboard the vehicle.

7. The vehicle of claim 1, wherein the vehicle has an operator cab configured to hold an operator, wherein the vehicle diagnostic system further comprises a user input configured to accept input from the operator, and wherein the display and the user input are located within the operator cab.

8. The vehicle of claim 1, wherein the plurality of controllers comprise an engine controller connected to an engine of the vehicle and configured to control the engine, a transmission controller connected to a transmission of the vehicle and configured to control the transmission, and a brake controller connected to a brake system of the vehicle and configured to control the brake system.

9. The vehicle of claim 8, wherein the vehicle further comprises a fuel system configured for providing fuel to the engine, and the plurality of controllers further comprise a fuel controller connected to the fuel system and configured to control the fuel system, wherein the fuel controller is connected to the vehicle network, wherein the primary vehicle controller is further configured to communicate with the fuel controller, and wherein the vehicle diagnostic system is further configured to display diagnostic information from the fuel controller.

10. The vehicle of claim 1, wherein the vehicle diagnostic system is further configured to operate in a display mode, wherein the vehicle diagnostic system is configured to display operating information regarding the vehicle.

11. The vehicle of claim 1, wherein the vehicle further includes a body supported by the chassis, and wherein the vehicle diagnostic system is further configured to display diagnostic information from the body in the diagnostic mode.

12. The vehicle of claim 11, wherein the plurality of controllers comprise a body controller connected to the body and configured to control the body, wherein the body controller is connected to the vehicle network, and the primary vehicle controller is configured to communicate with the body controller, wherein the vehicle diagnostic system is further configured to communicate with the body controller such that the vehicle diagnostic system is configured to display diagnostic information from the body controller in the diagnostic mode, and wherein the vehicle diagnostic system is configured for transmitting a second signal to the body controller to force a second output from the body controller.

13. The vehicle of claim 1, wherein the vehicle diagnostic system is further configured to display active fault codes from one or more of the plurality of controllers.

14. The vehicle of claim 1, wherein the vehicle diagnostic system is further configured to monitor all messages on the vehicle network and to display diagnostic information related only to specific messages pertinent to desired functionality.

15. The vehicle of claim 1, wherein the vehicle diagnostic system is configured to execute a light checking function, wherein the light checking function cycles through activating a first plurality of external vehicle lights on a first side of the vehicle followed by a second plurality of external vehicle lights on a second side of the vehicle, thereby allowing a single user to inspect all of the external vehicle lights.

16. A vehicle comprising:
a chassis;
a plurality of wheels connected to the chassis;
a vehicle control system configured for controlling a plurality of different components of the vehicle;
a vehicle network connected to the vehicle control system and configured to permit communication between components of the vehicle control system; and
a vehicle diagnostic system comprising a memory, a processor, and a user interface including a display configured for displaying information and a user input configured to receive input from an operator, the vehicle diagnostic system connected to the vehicle network and configured to communicate with the vehicle control system, wherein the vehicle diagnostic system is configured to operate in at least a display mode and a diagnostic mode, wherein the vehicle diagnostic system is configured to display operating information regarding the vehicle in the display mode, and wherein the vehicle diagnostic system is configured to display diagnostic information from the vehicle control system in the diagnostic mode,
wherein the vehicle diagnostic system is configured to monitor all messages on the vehicle network and only take action on messages with pre-defined headers.

17. The vehicle of claim 16, further comprising an operator cab supported by the chassis and configured to hold the operator, and wherein the user interface is positioned within the operator cab.

18. The vehicle of claim 16, wherein the memory, the processor, and the user interface of the vehicle diagnostic system are all located onboard the vehicle.

19. The vehicle of claim 16, further comprising a brake system connected to the chassis, the brake system comprising a main brake and a parking brake, wherein the vehicle diagnostic system is configured to continuously monitor whether the vehicle is stationary and the parking brake is engaged, and wherein the vehicle diagnostic system is configured such that the diagnostic mode is only accessible through the user interface when the vehicle diagnostic system detects that the vehicle is stationary and the parking brake is engaged.

20. The vehicle of claim 16, wherein the vehicle diagnostic system is further configured to display active fault codes from at least the vehicle control system in the diagnostic mode.

21. The vehicle of claim 16, wherein the vehicle diagnostic system is further configured to display error messages and warning messages during the display mode.

22. The vehicle of claim 16, wherein the vehicle diagnostic system is further configured to display diagnostic information related only to specific messages pertinent to desired functionality based on the pre-defined headers.

23. The vehicle of claim 16, wherein the vehicle diagnostic system is configured for transmitting a signal to force an output from the vehicle control system.

24. The vehicle of claim 23, wherein the vehicle control system further comprises a plurality of controllers configured for controlling the different components of the vehicle and a primary vehicle controller, and wherein the vehicle diagnostic system is configured for transmitting the signal directly to a first controller of the plurality of controllers to force the output from the first controller.

25. The vehicle of claim 23, wherein the vehicle control system further comprises a plurality of controllers configured for controlling the different components of the vehicle and a primary vehicle controller, and wherein the vehicle diagnostic system is configured for transmitting the signal to the primary vehicle controller to instruct the primary vehicle controller to force the output from a first controller of the plurality of controllers.

26. A vehicle diagnostic system configured for use with a vehicle comprising a chassis, a plurality of wheels connected to the chassis, a vehicle control system comprising a plurality of controllers configured for controlling a plurality of different components of the vehicle, and a vehicle network connected to the vehicle control system and configured to permit communication between components of the vehicle control system, the vehicle diagnostic system comprising:
a computer-readable memory;
a processor connected to the computer-readable memory and configured to be connected to the vehicle network; and a user interface including a display connected to the processor and configured for displaying information and a user input configured to receive input from an operator, wherein the vehicle diagnostic system is configured to operate in a diagnostic mode, in which the processor is configured to perform:
- monitoring messages from the vehicle control system on the vehicle network;
- identifying specific messages from the vehicle control system on the vehicle network that are pertinent to desired functionality;
- displaying diagnostic information related to the specific messages, via the display;
- receiving an instruction from the operator through the user input, the instruction configured to force an output from the vehicle control system; and
- transmitting a signal to the vehicle control system, in response to receiving the input, the signal configured to cause the vehicle control system to force the output from a first component of the vehicle, wherein the vehicle diagnostic system is configured for transmitting control instructions to the first component through the vehicle control system, such that the control instructions from the processor to the first component to force the output are only accepted when received from the vehicle control system.

27. The vehicle diagnostic system of claim 26, wherein the vehicle further includes a brake system comprising a main brake and a parking brake, and wherein the processor of the vehicle diagnostic system is further configured to perform:
- continuously monitoring whether the vehicle is stationary and the parking brake is engaged, through communication with the vehicle control system;
- permitting access to the diagnostic mode by the operator through the user interface when the vehicle is stationary and the parking brake is engaged;
- preventing access to the diagnostic mode by the operator through the user interface when the vehicle is not stationary and/or the parking brake is not engaged.

28. The vehicle diagnostic system of claim 26, wherein the processor monitors all messages from the vehicle control system on the vehicle network.

29. The vehicle diagnostic system of claim 26, wherein the vehicle further includes an engine, a transmission, and a brake system, and the vehicle control system is connected to the engine, the transmission, and the brake system and configured to control the engine, the transmission, and the brake system.

30. The vehicle diagnostic system of claim 29, wherein the vehicle further includes a fuel system, and the vehicle control system is connected to the fuel system and configured to control the fuel system.

31. A computer-assisted method for use in connection with a vehicle comprising a chassis, a plurality of wheels connected to the chassis, a vehicle control system comprising a plurality of controllers configured for controlling a plurality of different components of the vehicle, and a vehicle network connected to the vehicle control system and configured to permit communication between components of the vehicle control system, the vehicle further including a vehicle diagnostic system comprising a computer-readable memory, a processor connected to the computer-readable memory and configured to be connected to the vehicle network, and a user interface including a display connected to the processor and configured for displaying information and a user input configured to receive input from an operator, the method comprising:
- monitoring messages from the vehicle control system on the vehicle network, by the processor;
- identifying specific messages from the vehicle control system on the vehicle network that are pertinent to desired functionality, by the processor;
- displaying diagnostic information related to the specific messages, via the display;
- receiving an instruction from the operator through the user input at the processor, the instruction configured to force an output from the vehicle control system; and
- transmitting a signal from the processor to the vehicle control system, in response to receiving the input, the signal configured to cause the vehicle control system to force the output from a first component of the vehicle,
- wherein control instructions are transmitted to the first component through the vehicle control system, such that the control instructions from the processor to the first component to force the output are only accepted when received from the vehicle control system.

32. A tangible, non-transitory computer-readable medium storing computer-executable instructions configured to cause a processor of a vehicle diagnostic system to perform the method of claim 31.

* * * * *